United States Patent [19]

Kreh

[11] Patent Number: 5,223,146
[45] Date of Patent: Jun. 29, 1993

[54] DISPERSION OF IRON (III) OXIDES USING CERTAIN DIHYDROXAROMATIC COMPOUNDS

[75] Inventor: Robert P. Kreh, Jessup, Md.

[73] Assignee: W. R. Grace & Co.-Conn., New York, N.Y.

[21] Appl. No.: 773,831

[22] Filed: Oct. 9, 1991

[51] Int. Cl.$^5$ .............................................. C02F 5/10
[52] U.S. Cl. .................................. 210/698; 210/699; 252/180; 422/14
[58] Field of Search .......................... 210/698-701; 252/180; 422/14, 16

[56] References Cited

U.S. PATENT DOCUMENTS

| | | | |
|---|---|---|---|
| 2,396,938 | 3/1946 | Bersworth | 210/698 |
| 3,898,037 | 8/1975 | Lange et al. | 134/3 |
| 4,124,500 | 11/1978 | Arghiropoulos et al. | 252/188 |
| 4,278,635 | 7/1981 | Kerst | 210/750 |
| 4,278,635 | 7/1981 | Kerst | 422/14 |
| 4,469,615 | 9/1984 | Tsuruoka et al. | 210/698 |
| 4,532,068 | 7/1985 | Fuchs et al. | 252/188.28 |
| 4,626,411 | 12/1986 | Nemes et al. | 210/750 |
| 4,728,497 | 3/1988 | Muccitelli | 422/16 |
| 4,734,203 | 3/1988 | Lin et al. | 210/698 |
| 4,762,621 | 8/1988 | Masler et al. | 210/701 |
| 5,094,814 | 3/1992 | Soderquist et al. | 210/698 |

FOREIGN PATENT DOCUMENTS 192442  8/1986  European Pat. Off. .
239288  9/1987  European Pat. Off. .
58-133382  9/1983  Japan .

OTHER PUBLICATIONS

Proceedings-International Water Conference, Engineering Society, Westchester, Penna. (1978) 39 299-308.
Water-Formed Scale Deposits by J. C. Cowan et al, p. 277 (1976).
Bull. Chem. Soc. Jap. 36 (No. 11) pp. 1408-1411.
Journal of the American Chemical Society 100:17 5362 (1978).
Clay Minerals (1977) 12 127.
Med. Fac. Landbouww. Rijksuniv. Gent 42 (1977) 2025-2029.

*Primary Examiner*—Peter Hruskoci
*Attorney, Agent, or Firm*—James P. Barr

[57] ABSTRACT

A method for treating an aqueous system which contains solid particles of iron (III) oxide is disclosed which comprises adding to the system catechol, hydroquinone, their water soluble salts, and mixtures thereof in an amount effective to disperse or suspend iron (III) oxide particles. The aqueous system should have a pH greater than 7 and have low to moderate hardness.

5 Claims, No Drawings

DISPERSION OF IRON (III) OXIDES USING CERTAIN DIHYDROXAROMATIC COMPOUNDS

FIELD OF THE INVENTION

This invention relates to a process of dispersing iron oxides in aqueous systems using certain dihydroxyaromatic compounds, and more specifically to a method of treating an aqueous system with catechol, hydroquinone, their water soluble salts, or mixtures thereof.

BACKGROUND OF THE INVENTION

It is known in the prior art that aqueous systems, particularly industrial aqueous systems such as boiler systems, heat exchangers, cooling towers, desalinization equipment, etc., are subject to the accumulation and deposition of solid particles on the internal surfaces of the equipment and pipes. Such deposits are undesirable since they greatly retard the transfer of heat by limiting or reducing the circulation of water and by insulating the surface of the equipment which the circulating water is intended to cool. In addition, serious corrosion may occur on the equipment surfaces below such deposits.

Among the various undesirable deposits that may form and accumulate in aqueous systems are deposits of insoluble iron compounds that are derived from soluble iron which is present in the system. The deposition of iron oxide is of particular concern in today's boiler water treatment programs. It is believed that much of the iron oxide precipitates are comprised of ferric oxide and ferric hydroxide, wherein the iron is in its oxidation state of three. For purposes of this invention, iron oxide precipitates are hereinafter referred to as iron (III) oxide.

The control or elimination of iron (III) oxide deposits is commonly effected by the addition of chelants, or chelant/polymer treatments. However, chelants are known to be corrosive, and the excess overfeed of chelants has been known to dissolve and remove large quantities of iron oxides. This is undesirable since the chelant does not distinguish between the objectionable iron oxide deposits and the protective film of magnetite ($Fe_3O_4$—the oxide formed under boiler conditions).

Both catechol and hydroquinone are commercially available materials which have heretofore been used in boiler systems as oxygen scavengers. It was surprising and unexpected that these compounds would also provide effective iron (III) oxide dispersing abilities in aqueous systems, particularly since other dihydroxybenzene compounds, such as for example, resorcinol, were not effective at all in dispersing iron (III) oxide.

SUMMARY OF THE INVENTION

It is an object of this invention to provide a novel iron (III) oxide dispersing agent.

It is another object of this invention to provide a process for dispersing or suspending solid particles of iron (III) oxide in aqueous systems.

In accordance with the present invention, there have been provided certain novel iron (III) oxide dispersing agents comprising dihydroxy benzenes selected from the group consisting of catechol, hydroquinone, their water soluble salts, and mixtures thereof.

These and other objects will be apparent from the remaining specification and the appended claims.

DETAILED DESCRIPTION

The present invention is directed to the process of using certain dihydroxyaromatic chemicals in aqueous systems to disperse or suspend solid particles of iron (III) oxide. It has now been found that the use of catechol, hydroquinone, their water soluble salts and mixtures thereof is very effective in preventing deposition and/or reducing the tendency of iron compounds to deposit on the surfaces of aqueous systems. The use of the dispersing agents of this invention has been found to be most advantageous in aqueous systems wherein the pH of the water is greater than 7, preferably in the range 8-10, and wherein the hardness of the water is characterized as low to moderate.

Both the catechol and the hydroquinone are generally used in their protonated form. However, it is also possible to use them in the form of a water soluble salt, particularly salts of an alkali metal such as sodium or potassium, as well as ammonium or lower amine salts, although the use of zinc, molybdate or other salts is not excluded.

The dihydroxybenzene compounds of the present invention may be used in various aqueous systems which include, but are not limited to, recirculating water systems such as boiler systems, heat exchangers, cooling towers, desalinization equipment, and the like. In as much as these compounds are stable at high temperatures and pressures, the use of these compounds as iron (III) oxide dispersants is particularly advantageous in high temperature boiler systems. In general, the dispersing agents of this invention should be present in the aqueous system in a concentration between 1 and 100 ppm, preferably between 2 and 50 ppm.

The iron III oxide dispersing agents of this invention may be used in combination with other known water treatment additives which include, but are not limited to, scale inhibitors such as phosphates, phosphonates and the like, corrosion inhibitors, biocides, other iron dispersing agents, oxygen scavengers, neutralizing amines and filming amines, pH regulating agents, chelants, and mixtures thereof, as will be known by those skilled in the art.

The iron (III) oxide dispersants of this invention may be added to the aqueous system by any of the conventional means such as, for example by conventional by-pass feeder using briquettes containing the dispersant, by adding the dispersant either separately or together with the above-described water treatment additives to the water, or it can be fed as a pre-diluted aqueous feed solution containing the treatment components. Without further elaboration, it is believed that one skilled in the art, using the preceding detailed description can utilize the present invention to its fullest extent.

The following examples are provided to illustrate the invention in accordance with the principles of this invention, but are not to be construed as limiting the invention in any way except as indicated in the appended claims. All parts and percentages are by weight unless otherwise indicated.

EXAMPLE 1

An aqueous solution was prepared containing 99 ppm $CaSO_4$, 13 ppm $CaCl_2$, 55 ppm $MgSO_4$ and 176 ppm $NaHCO_3$. The pH of the solution was adjusted to 8.1 with an aqueous sodium hydroxide solution. To this solution was added 50 ppm catechol and 1000 ppm iron (III) oxide powder having a particle size range between 1 and 10 microns. This mixture was stirred continuously for 17 hours at 54° C. and then allowed to settle, undisturbed for 60 minutes. A sample was then removed at a 50% depth and was analyzed, after acidification with HCl, by atomic absorption. The concentration of suspended iron in the sample was 270 ppm.

EXAMPLE 2

The procedure according to Example 1 was repeated except that no catechol was added to the aqueous mixture. The amount of suspended iron in the sample was less than 20 ppm.

EXAMPLE 3

The procedure according to Example 1 was repeated except that 50 ppm of hydroquinone was substituted in place of the catechol. The amount of suspended iron in the sample was 410 ppm.

I claim:

1. A process for dispersing or suspending solid particles of iron (III) oxide in an aqueous system having a pH greater than 7 comprising adding to the system a dispersing agent selected from the group consisting of catechol, hydroquinone, their water soluble salts, and mixtures thereof, in an amount effective to disperse or suspend the iron (III) oxide particles.

2. A process according to claim 1 wherein the dispersing agent is added at a concentration of from 1 ppm to 100 ppm.

3. A process according to claim 1 wherein the dispersing agent is added at a concentration of from 2 ppm to 50 ppm.

4. A process according to claim 1 wherein the pH of the system is between 8 and 10.

5. A process according to claim 1 wherein the dispersing agent is used in combination with a water treatment additive selected from the group consisting of scale inhibitors, corrosion inhibitors, biocides, oxygen scavengers, neutralizing amines, filming amines, pH regulating agents, chelants, and mixtures thereof.

* * * * *